US008487737B2

(12) United States Patent
Forsström

(10) Patent No.: US 8,487,737 B2
(45) Date of Patent: Jul. 16, 2013

(54) FLEXIBLE CONTROL PANEL

(75) Inventor: Göran Forsström, Västerås (SE)

(73) Assignee: ABB AB, Västerås (SE)

( * ) Notice: Subject to any disclaimer, the term of this patent is extended or adjusted under 35 U.S.C. 154(b) by 959 days.

(21) Appl. No.: 10/585,122

(22) PCT Filed: Dec. 30, 2004

(86) PCT No.: PCT/SE2004/002043

§ 371 (c)(1),
(2), (4) Date: Apr. 12, 2007

(87) PCT Pub. No.: WO2005/064758

PCT Pub. Date: Jul. 14, 2005

(65) Prior Publication Data

US 2007/0285278 A1 Dec. 13, 2007

(30) Foreign Application Priority Data

Dec. 31, 2003 (SE) .................................... 0303616

(51) Int. Cl.
*G05B 23/00* (2006.01)

(52) U.S. Cl.
USPC ....... 340/3.1; 340/10.1; 340/10.6; 340/572.5; 341/20; 341/22

(58) Field of Classification Search
USPC ................ 340/3.1, 10.1, 10.6, 572.5; 341/20, 341/22; 345/168, 172; 400/492
See application file for complete search history.

(56) References Cited

U.S. PATENT DOCUMENTS

| | | | | |
|---|---|---|---|---|
| 5,579,002 | A * | 11/1996 | Iggulden et al. | 341/23 |
| 6,140,593 | A * | 10/2000 | Bramesfeld et al. | 200/5 A |
| 6,169,651 | B1 | 1/2001 | Dias | |
| 6,650,254 | B1 * | 11/2003 | Rix | 341/22 |
| 7,006,014 | B1 * | 2/2006 | Henty | 341/22 |
| 2003/0096607 | A1 | 5/2003 | Taylor | |
| 2004/0056781 | A1 * | 3/2004 | Rix et al. | 341/20 |

FOREIGN PATENT DOCUMENTS

| | | | |
|---|---|---|---|
| DE | 35 15 945 | A1 | 11/1986 |
| DE | 99/30214 | | 6/1999 |
| DE | 102 14 767 | A1 | 10/2003 |
| EP | 0523 848 | A1 | 1/1993 |
| WO | WO 03/036324 | A1 | 5/2003 |

OTHER PUBLICATIONS

IBM Technical Disclosure Bulletin, "Boardless Terminal Keyboard," vol. 32, No. 10A, Mar. 1990, pp. 82-84.*
Communication Pursuant to Article 96(2) EPC, issued by the European Patent Office on Jul. 26, 2007, in connection with Counterpart European Application No. 04 809 216.7.

* cited by examiner

*Primary Examiner* — Edwin Holloway, III
(74) *Attorney, Agent, or Firm* — Venable LLP; Eric J. Franklin

(57) ABSTRACT

A device for control and monitoring equipment including a control panel and at least one control member. The control member includes a readily movable module which may be detachably located on the front surface of the control panel. The module communicates in a wireless manner with a central unit, via which externally controlled units are influenced/controlled.

10 Claims, 6 Drawing Sheets

FLEXIBLE CONTROL PANEL

CROSS-REFERENCE TO RELATED APPLICATIONS

This application claims priority to Swedish patent application 0303616-7 filed 31 Dec. 2003 and is the national phase under 35 U.S.C. §371 of PCT/SE2004/002043 filed 30 Dec. 2004.

TECHNICAL FIELD

The present invention relates primarily to a control system or the like equipment for controlling machines or industrial processes.

The invention especially relates to such control equipment that may easily be adapted to different purposes and different industrial processes.

One special field of application are control panels or control desks for electronic or electric control equipment and where the different control sections consist of modules.

BACKGROUND OF THE INVENTION

It has proved that operators working in process plants, such as factories, electric utilities and the like, prefer to carry out their work with the aid of older types of control equipment, instrument and control panels rather than the more modern display screens.

One disadvantage of the older type of control equipment is the significantly lower flexibility. Instruments and control buttons cannot, of course, be readily replaced or moved about on the control panel, among other things because of the extensive wiring that this would require. This entails considerable drawbacks when the controlled processes are changed, updated or replaced. Currently, supervision and control are therefore carried out to an increasing extent with the aid of display screens, the interfaces of which may be readily adjusted to different purposes and needs. The contents of the display screens are, of course, controlled by the processes in a computer.

OBJECT AND MOST IMPORTANT CHARACTERISTICS OF THE INVENTION

The object of the invention is to provide a device wherein said disadvantages are eliminated and which suggests a control system that is flexible and readily adaptable to successively varying industrial processes or the needs and wishes of individual operators.

The invention also relates to a system for control and monitoring equipment comprising a control panel and at least one control member.

The invention is achieved in that the control member comprises an easily movable module that may be detachably placed on the front surface of the control panel and that the module communicates wirelessly with a central unit, via which externally controlled units are influenced/controlled.

BRIEF DESCRIPTION OF THE ACCOMPANYING DRAWINGS

The invention will be explained in greater detail in the following with reference to the accompanying drawings.

FIG. 1 schematically shows a cross section through a control panel according to the invention.

DESCRIPTION OF PREFERRED EMBODIMENTS OF THE INVENTION

To achieve sufficiently high flexibility in an installation with discrete components, instruments and control devices, it is important that the cabling be reduced to a minimum. The problems of older types of control panels were to a great extent due to the instruments and control sections being secured to the control panel which required extensive cabling, not only between the control panel and the machines being controlled but also in the actual control panel.

Figure 1:
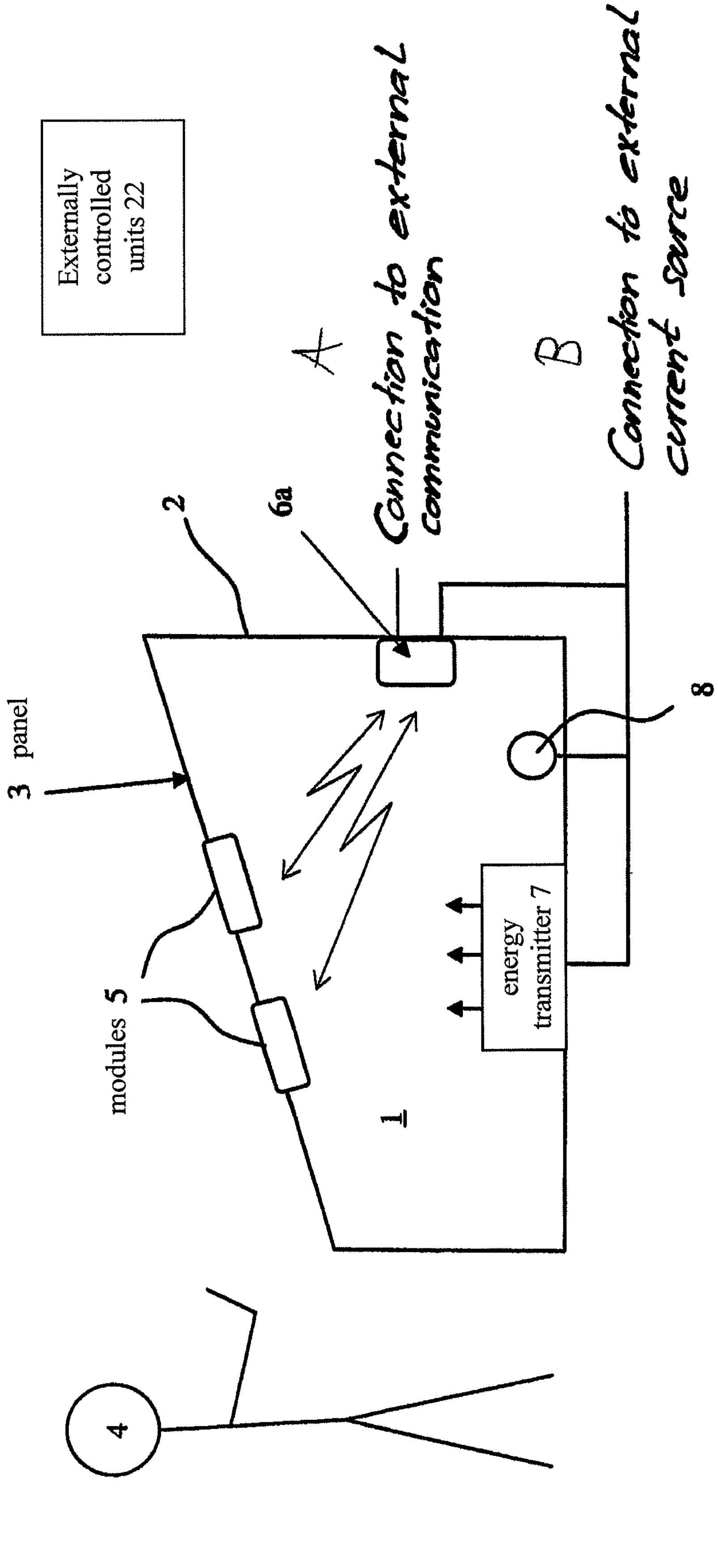

According to the invention, the control panel (see FIG. 1) comprises a box 2 of a suitable material such as, for example, steel, aluminium or plastic. The upper side of the box, the panel 3, may be somewhat inclined towards an operator 4 to improve his or her overview of instruments and control members. The instruments and control members, which may be voltmeters, switches, potentiometers, indicators, control lamps, etc., lack physical/galvanic external connections out from the control panel 1, but also lack physical/galvanic connections inside the box 3 itself.

Each individual function instead consists of a movable interaction unit, control member or a module 5 which communicates its data in a wireless manner, for example by means of Bluetooth technique, with a central communication unit 6*a* located in or adjacent to the box 6. An identity or address is allocated to each module 5, which enables individual communication with each module 5, either between the modules 5 if this should be desired, or with the central communication unit 6*a*.

The central communication unit 6*a*, in turn, communicates with the machines or processes 22 that are to be monitored or controlled. This communication may occur wirelessly or preferably over physical cables.

The modules 5 may be supplied with current with the aid of batteries placed in each module 5, but more preferably via a system without batteries and wires. Such a system may be an electromagnetic transfer of electrical energy. An energy transmitter 7 in the form of a coil or the like is then placed in or adjacent to the control panel 1 and connected to a suitable external current supply. The electromagnetic field thus generated in this energy transmitter 7 is taken up by the modules 5 through suitable components, for example small coils, located therein. The electronics in the modules 5 should be of a low-energy type, since wireless transmission of energy entails limitations.

The modules 5 may constitute instruments displaying different measured values. They may be pointer instruments but also digital instruments using liquid crystals for displaying alphanumerical symbols, etc. To increase the readability of these modules, the control panel 1 may be provided with a “background light”. It the simplest case, this may consist of one or more light sources 8 such as lamps placed in the box 2 and connected to an external current source. By designing the modules 5 transparent, the light may pass out through the modules 5, thus obtaining good readability of instruments and control members.

Figure 2:
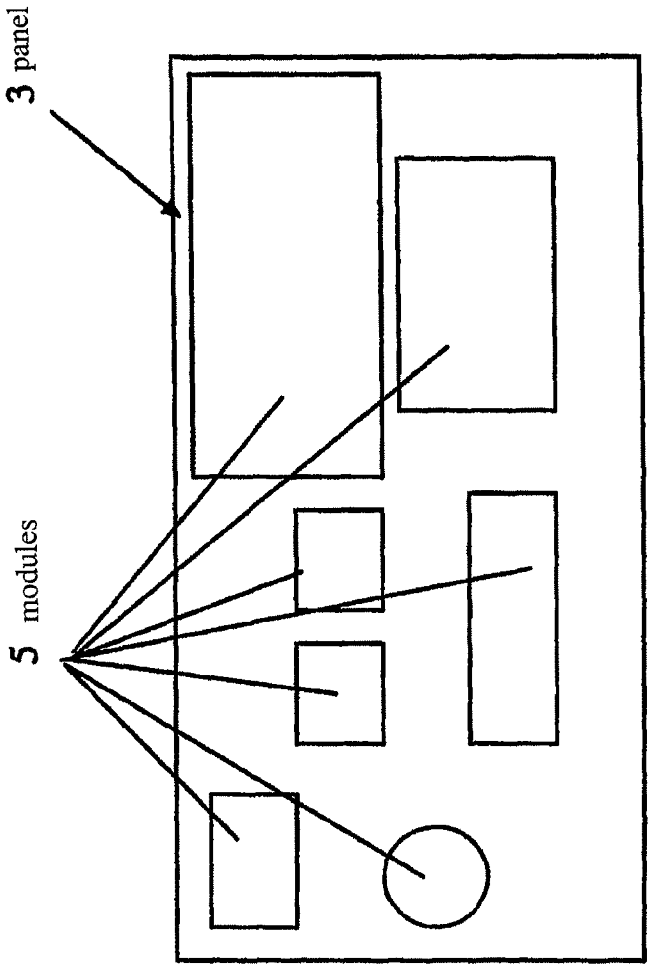
FIG. 2 shows, in principle, a feasible variant of the control panel from above.
Figure 4:
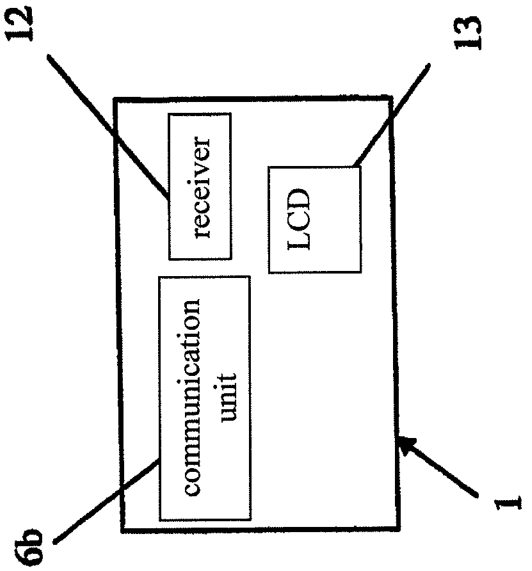
FIG. 4 shows the control panel in FIG. 3 but from the under side thereof.
Figure 3:
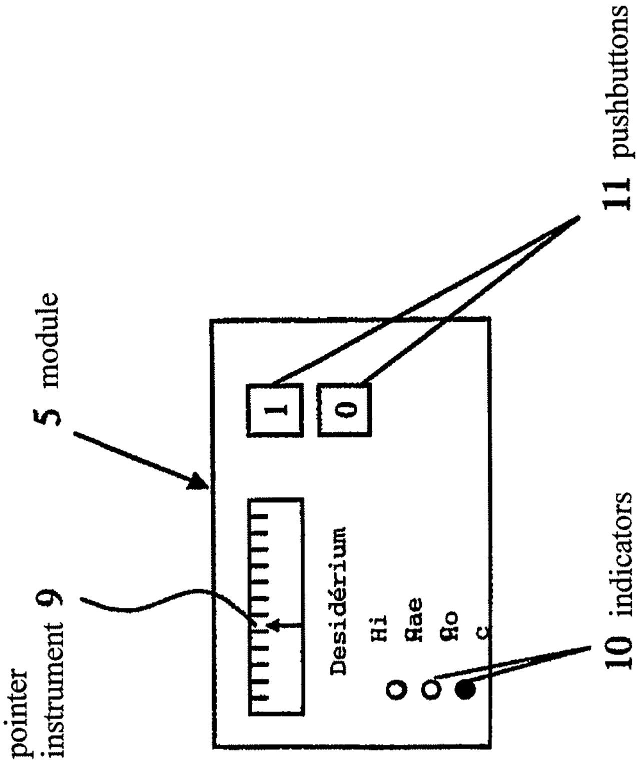
FIG. 3 shows another variant of an inventive control panel from above.

FIG. 2 schematically shows a control panel 1 from above, wherein different modules 5 are distributed on a panel 3. In this case, the panel 3 has recesses wherein the modules 5 may be easily pressed down and where they are securely positioned until they need to be moved again. FIG. 3 shows a module 5 which is here provided with a pointer instrument 9, a few indicators 10 and a few pushbuttons 11. FIG. 4 shows the most important components/functions of the module 5, which are directed towards the interior of the control panel 1. Here, a communication unit 6*b*, a receiver 12 for electrical energy and an LCD unit 13, operating with the internal background light, are located.

Figure 5:
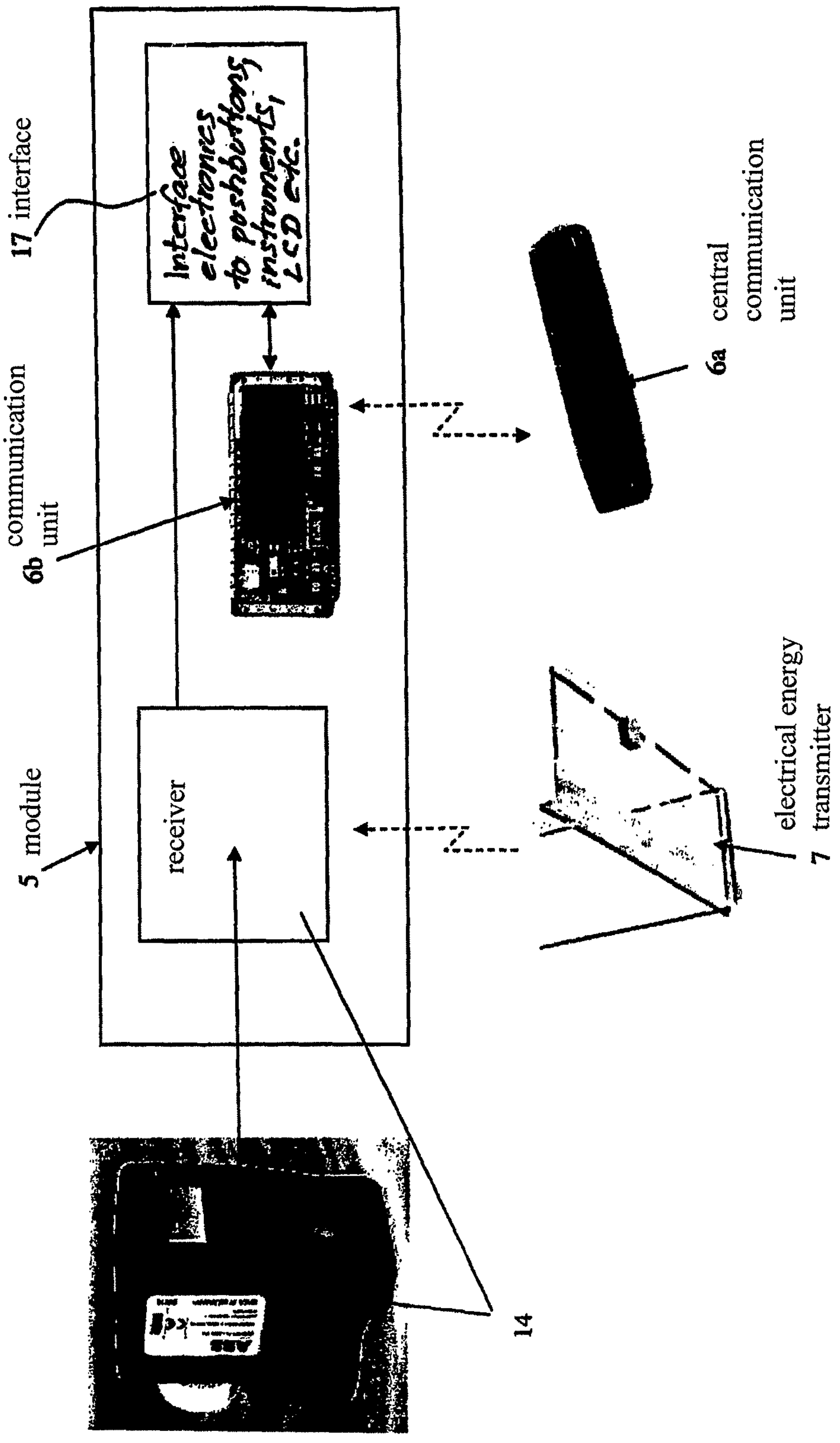
FIG. 5 shows individual parts of the control panel.

FIG. 5 shows a module 5 and a few concrete examples of an electrical energy transmitter 7, an electrical energy receiver 14, a central communication unit 6*a* and a communication unit 6*b* for Bluetooth communication as well as an interface 17 to the switches, indicators and instruments of the modules 5.

Figure 6:
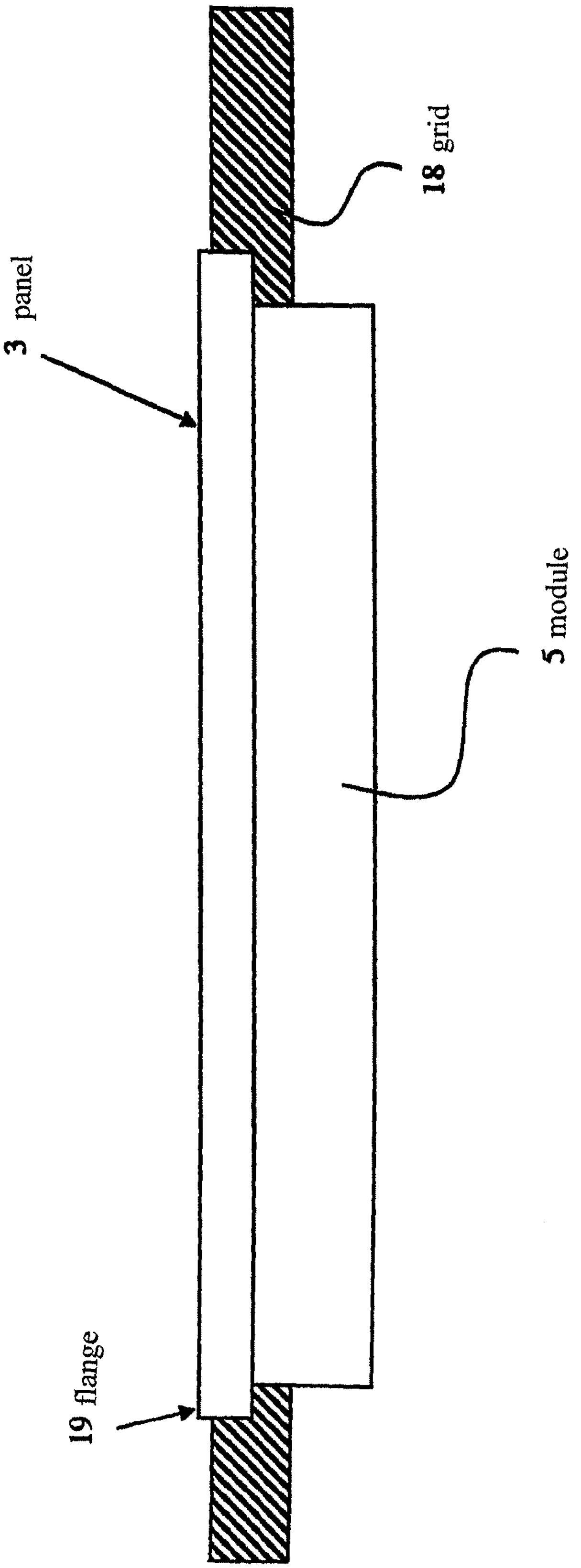
FIG. 6 shows a cross section through the upper side of the control panel, wherein the section intersects an interaction unit.

FIG. 6 shows a cross section through a panel 3, here consisting of a grid 18 of metal or plastic in which recesses, adapted for standardized modules 5, are arranged. The module 5, which is provided with a flange 19, is lowered into one of the recesses and may, if desired, be screwed to the grid 18.

Figure 7:
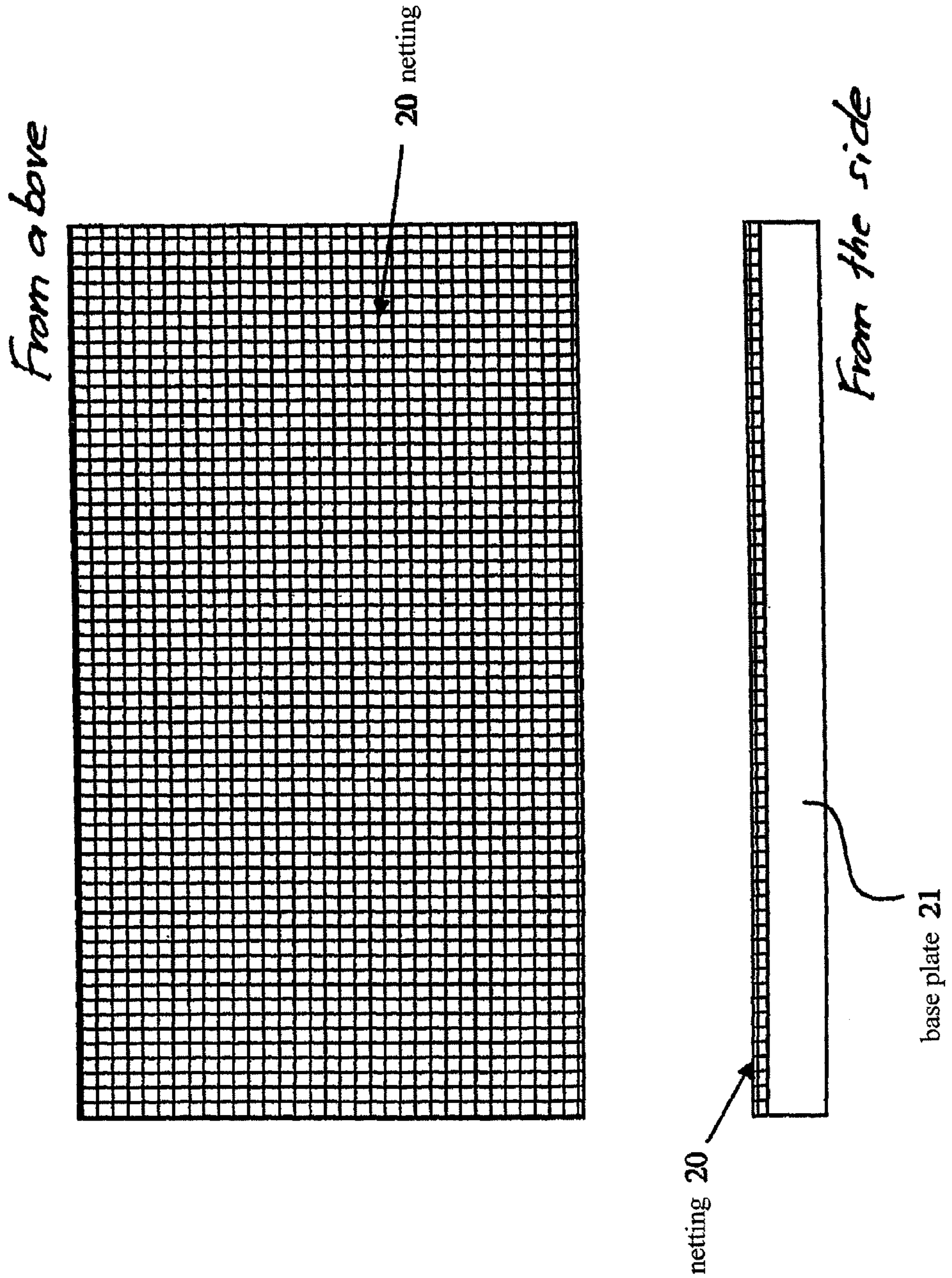
FIG. 7 shows an alternative embodiment, which is transparent to light, of the upper side of the control panel.

FIG. 7, finally, shows a transparent panel 3 provided with a netting 20 of thin metal arranged on a transparent base plate 21. The modules 5 may be provided with small magnets (not shown) which secure them in the desired position on the panel 3. This gives a very flexible system which at the same time is transparent and may use background light.

The control panel 1 according to the invention, as well as the modules 5 designed therefor, thus result in a system that is very flexible. The modules 5, which are preferably totally enclosed, may be readily replaced or moved about such that the control panel 1 is all the time maximally adapted to the installation to be monitored or controlled. No re-connection of cables is required. Also individual needs and desires on the part of the operators 4 may be readily satisfied. This may be important in order to achieve higher efficiency and monitoring capacity. The latter is, of course, not least important, for example in critical processes such as in nuclear power plants or the like.

Although the invention has been described above by means of a few concrete embodiments, the invention is not, of course, limited to these embodiments; other embodiments and variants are feasible within the scope of protection of the claims.

The invention claimed is:

1. A modular system for control and monitoring equipment, comprising:

an enclosure including an upper surface including at least one opening extending therethrough;

at least two movable modules that fit into the at least two openings in the upper surface of the enclosure such that each movable module fits into one opening, wherein each movable module comprises more than one instrument, indicator or control member configured to remotely monitor or control at least one device remote from the modular system, wherein each moveable module comprises a communication unit configured to wirelessly communicate data, wherein the communication unit of each module is configured to wirelessly communicate data with other moveable modules, and wherein each moveable module is wirelessly powered;

attachment elements on the at least one movable module and upper surface of the enclosure configured to attach the at least two movable modules to the upper surface of the enclosure; and a central unit configured to transmit to and receive signals from the communication member of the at least two movable modules, wherein the central unit is configured to influence/control units external to the system, wherein the at least two movable modules receive signals from and transmit signals to the central unit.

2. The system according to claim 1, wherein the at least two movable modules are adapted to work with wirelessly transferred electrical energy transmitted by an electrical energy transmitter located in or adjacent the enclosure.

3. The system according to claim 1, further comprising:

a light source arranged in the enclosure and comprising a light used for background lighting of the at least two movable modules located on the upper surface of the enclosure.

4. The system according to claim 1, wherein the at least two movable modules comprise an internal electric power source.

5. The system according to claim 1, wherein the attachment elements further comprise a flange on the at least two movable modules to retain the at least two movable modules in the at least two openings.

6. The system according to claim 1, wherein the attachment elements further comprise a plurality of magnets to magnetically attach the at least two movable modules to the upper surface of the enclosure.

7. The system according to claim 1, further comprising:

at least one light source configured to light the at least two movable modules, wherein the at least one light source is internal to the at least two movable modules.

8. The system according to claim 1, wherein the at least one instrument or control member comprises at least one indicator, pointer, pushbutton, switch, or display.

9. The system according to claim 1, wherein the at least two movable modules communicate with the central unit with bluetooth.

10. The system according to claim 1, wherein each of the at least two movable modules is powered inductively.

* * * * *

UNITED STATES PATENT AND TRADEMARK OFFICE

CERTIFICATE OF CORRECTION

PATENT NO. : 8,487,737 B2
APPLICATION NO. : 10/585122
DATED : July 16, 2013
INVENTOR(S) : Forsstrom It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this
Eleventh Day of November, 2014

Michelle K. Lee
*Deputy Director of the United States Patent and Trademark Office*